Sept. 23, 1941.  W. C. FERGUSON  2,256,864
SEALING COMPOSITION
Filed May 11, 1940

William C. Ferguson
Inventor
Haynes and Koenig
Attorneys

Patented Sept. 23, 1941

2,256,864

UNITED STATES PATENT OFFICE 2,256,864

SEALING COMPOSITION

William C. Ferguson, St. Louis, Mo.

Application May 11, 1940, Serial No. 334,513

5 Claims. (Cl. 20—56.4)

This invention relates to sealing compositions or materials, and more particularly to a sealing strip.

Among the objects of the invention are the provision of a sealing strip which is easily attached to cover a joint, which effectively seals the joint, and which is not susceptible to destruction through atmospheric agencies; also to the provision of a material which is not subject to substantial variation in properties with variation in temperature; also to a material which may be applied to joints of complicated configurations. Other objects will be in part obvious and in part pointed out hereinafter.

The invention accordingly comprises the ingredients and combinations of ingredients, the proportions thereof, and features of composition, which will be exemplified in the products and compositions hereinafter described, and the scope of the application of which will be indicated in the following claims.

In the accompanying drawing, in which is illustrated one of various possible embodiments of the invention, Fig. 1 is a plan view showing a sealing strip prepared in accordance with the present invention;

The sealing of joints, for example, the joint between a pane of glass and a window frame, is frequently a difficult matter. In general, it is a relatively time-consuming process, and frequently the joint must be re-sealed from time to time, because of deterioration of the sealing composition. Moreover, since the expansion caused by change in temperature varies with different materials, a certain amount of elasticity must be present in the sealing compound. Otherwise changes in the temperature to which joints are usually subjected will cause a loosening and consequent failure of the seal.

According to the present invention a composition is provided which may be quickly and easily applied to a joint such as a joint between a pane of glass and a window frame, and which will effectively seal the joint between the two objects. The sealing composition is, in addition, extremely resistant to atmospheric deterioration, and remains in position forming an effective seal for a substantially indefinite period of time. In addition, this sealing composition has an extremely low susceptibility to temperature change, and therefore remains in place throughout wide variations in temperature. This is particularly important where the joint is exposed to exterior temperatures. In addition, the sealing composition of the present invention remains plastic over a substantially indefinite period of time, and therefore continues to effectively seal the joint, although subjected to relatively wide variations in temperature.

Figure 1:
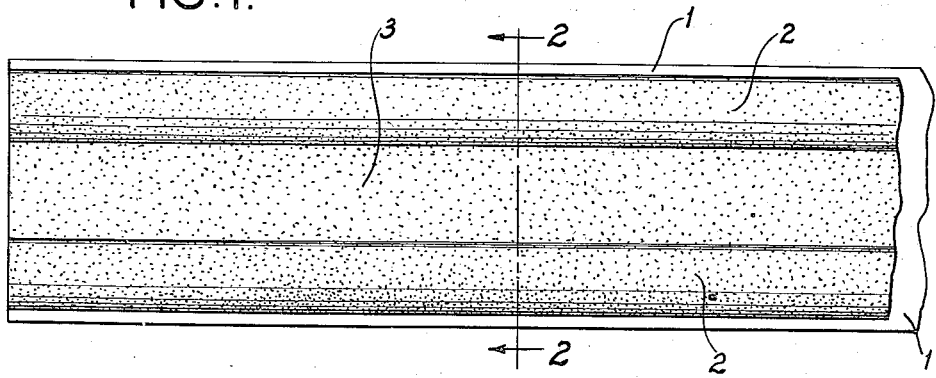
Figure 2:
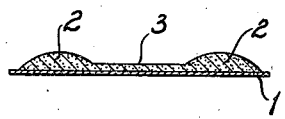
Fig. 2 is a cross section taken along the line 2—2 of Fig. 1.

Referring now to the drawing in Fig. 1, numeral I represents a relatively flat, non-resilient deformable-strip or backing support made, for example, of metal such as lead foil. Applied thereto is a relatively thick coating 2 of a plastic, gum-like adhesive having a low susceptibility to change in temperature. This may be, for example, an asphalt of tacky consistency, to which has been added the customary fillers and strengtheners. The relative thickness of the gum-like material in relation to that of the strip on which it is coated, is shown more clearly in Fig. 2.

Figure 3:
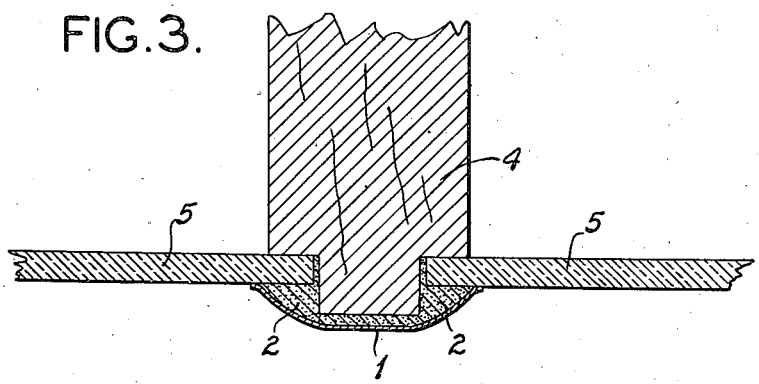
Fig. 3 is a cross section of a joint to which the sealing strip has been applied, showing the strip in place.

For ease in application to such joints as between two panes of window glass and a frame, the plastic, gum-like adhesive is preferably applied more thickly toward the outer edges of the strip than towards the center. Thus the center portion 3 is shown as of less thickness, that is, relatively thinner, than the remainder of the coating. This aids in application to places such as shown in Fig. 3 where the strip is applied to a window frame 4 and panes of glass 5. For application to other types of joints a different configuration may be preferable. The gum-like consistency of the adhesive permits filling in adequately all spaces around the joint, and makes an effective seal.

A suitable plastic base, for example, can be made by heating together a soft tacky natural asphalt (or a petroleum asphalt, such as a lubricating oil still residue) plasticized with a portion of a non-oxidizing liquid; for example, a relatively non-volatile petroleum oil, such as a motor lubricating oil of an S. A. E. viscosity of 50. This is preferably blended with a small quantity of aluminum stearate. For example, 39.50 parts of such a lubricating oil blended with 1.00 part of aluminum stearate, may be heated with 10.25 parts of such an asphalt to a temperature of 250° F., thereby forming a homogeneous mixture.

To this plastic base may also be added, if desired, the customary proportions of fillers, such as limestone dust or a fine sand, and of fiber to add to the toughness of the composition. Likewise, a small quantity of crepe rubber or the like may be added to improve the stretchability and ductility of the plastic base.

The ingredients are all worked together to form a homogeneous gummy base, and this base is then applied uniformly to a deformable strip, such as a strip of lead foil or the like. The coating is applied in sufficient quantity so as to be thicker than the thickness of the strip, and if the sealing strip is to be applied over joints such as shown in Fig. 3, it is preferable to make the center portion of less thickness than that of the side. Likewise, it is preferable, as shown in Fig. 1, that the plastic gum-like adhesive shall not extend to the edge of the strip, so that when applied to a joint there will be no tendency for the plastic material to exude over the edge of the tape, and thus detract from the workman-like character of the final job.

Other gummy plastic base materials are likewise suitable for use in connection with this invention. They must, however, be adhesive, and must have a low susceptibility to variation in temperature, especially if the sealing composition is intended for use upon joints subjected to exterior temperature conditions. Natural or artificial resinous materials which possess the foregoing properties may be substituted for the asphalt described above to form compositions contemplated by the present invention.

In actual use, it will be found that the sealing composition of the present invention will effectively close joints. It will not age over substantially indefinite periods of time, and will remain in place, effectively sealing the joint over wide variations in temperature. The asphalt-containing composition described above, for example, does not flow at 300° F. and is not brittle at —40° F. However, it is sufficiently plastic to fill all small openings and interstices. The sealing composition of the present invention is quickly and easily applied, and a relatively long joint or series of joints may be sealed with the present composition in a much shorter time than would be required if putty, for example, was employed. Since the present sealing compound does not tend to harden upon exposure to atmospheric conditions, or upon aging, there is no tendency to become brittle and to separate away from the joint, such as is encountered when putty is employed for this purpose. Moreover, the present sealing composition tends to adhere to the joint, and adds to the strength thereof.

Because of the foregoing it has been found that the composition of the present invention may be used to seal the joints between panes in a green house at much less cost than if the panes were sealed in by the usual method, and that the seal so obtained is much more effective than when putty or similar compositions are employed for this purpose. In addition, the seal remains effective over a substantially indefinite period of time, rather than breaking or chipping away, as happens when putty is used.

In forming the present composition, it is important that the gum-like plastic adhesive material be applied to the strip in substantial volume. Otherwise the seal obtained is not satisfactory.

The sealing strips of the present invention may be made in convenient lengths or in the form of a continuous strip or roll from which sections may be cut as needed.

In view of the above, it will be seen that the several objects of the invention are achieved and other advantageous results attained.

As many changes could be made in the above products and compositions without departing from the scope of the invention, it is intended that all matter contained in the above description or shown in the accompanying drawing shall be interpreted as illustrative and not in a limiting sense.

What is claimed is:

1. A strip-sealing material for glazing windows comprising a relatively flat non-resilient deformable backing support, a coating of plastic adhesive on said support, said coating comprising relatively thick edgewise regions only.

2. A strip-sealing material for glazing windows comprising a longitudinal relatively non-resilient deformable backing support, a coating of plastic adhesive on said support, said coating comprising a thin central relatively flat area and adjacent edgewise thicker areas.

3. A strip-sealing material for glazing windows comprising a longitudinal relatively flat non-resilient and deformable backing support, a coating of plastic adhesive on said support, said coating comprising a thin central relatively flat area and adjacent edgewise thicker areas of bulged form.

4. A strip sealing material of the character set forth in claim 1, in which the plastic adhesive is an asphaltic composition.

5. A strip sealing material of the character set forth in claim 1, in which the support is metal foil.

WILLIAM C. FERGUSON.